(12) United States Patent
Miller et al.

(10) Patent No.: US 10,233,128 B1
(45) Date of Patent: *Mar. 19, 2019

(54) METHOD AND COMPOSITION FOR AGRICULTURAL POTASSIUM AND NUTRIENT FERTIGATION

(71) Applicants: John C. Miller, Fresno, CA (US);
Deborah L. Miller, Fresno, CA (US)

(72) Inventors: John C. Miller, Fresno, CA (US);
Deborah L. Miller, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,449

(22) Filed: Nov. 29, 2017

Related U.S. Application Data

(63) Continuation of application No. 15/059,731, filed on Mar. 3, 2016, now Pat. No. 9,856,179, which is a continuation-in-part of application No. 14/833,484, filed on Aug. 24, 2015, now Pat. No. 9,474,215, which is a continuation-in-part of application No. 14/564,594, filed on Dec. 9, 2014, now Pat. No. 9,161,489.

(51) Int. Cl.
| | | |
|---|---|---|
| *C05D 1/00* | (2006.01) | |
| *A01C 23/04* | (2006.01) | |
| *C05C 9/00* | (2006.01) | |
| *C05B 7/00* | (2006.01) | |
| *C05B 17/00* | (2006.01) | |
| *C05G 3/00* | (2006.01) | |

(52) U.S. Cl.
CPC .............. *C05C 9/00* (2013.01); *A01C 23/042* (2013.01); *C05B 7/00* (2013.01); *C05B 17/00* (2013.01); *C05D 1/00* (2013.01); *C05G 3/0076* (2013.01)

(58) Field of Classification Search
CPC ................................ C05D 1/00; A01C 23/042
See application file for complete search history.

(56) References Cited

U.S. PATENT DOCUMENTS

| | | |
|---|---|---|
| 2,038,316 A | 4/1936 | Rosenstein |
| 2,088,869 A | 8/1937 | Porter |
| 2,163,065 A | 6/1939 | Rosenstein |
| 2,969,280 A | 1/1961 | Peck |
| 3,326,232 A | 6/1967 | Stamps et al. |
| 3,332,767 A | 7/1967 | Heins |
| 3,578,432 A | 5/1971 | Stiles |
| 3,888,652 A | 6/1975 | Yie et al. |
| 4,133,671 A | 1/1979 | Mikel |
| 4,145,208 A | 3/1979 | Gulko et al. |
| 4,337,786 A | 7/1982 | Myers et al. |
| 4,878,614 A | 11/1989 | Hach et al. |
| 4,917,304 A | 4/1990 | Mazzei et al. |
| 4,969,947 A | 11/1990 | Moore |
| 5,246,164 A | 9/1993 | McCann et al. |
| 5,678,771 A | 10/1997 | Chapman |
| 7,207,503 B1 | 4/2007 | Stengel et al. |
| 7,325,756 B1 | 2/2008 | Giorgis |

(Continued)

*Primary Examiner* — Wayne A Langel
(74) *Attorney, Agent, or Firm* — Andrew D. Fortney; Central California IP Group, P.C.

(57) ABSTRACT

An agricultural potassium-fertigation method for emitter-irrigation potassium-plus fertigation feeds a potassium-plus nutrient feedstock comprised of potassium formate and additional yield-assist constituent(s) and water to an active emitter-irrigation system discontinuously, at levels of 0.15 to 50 gal./min, during one to six nonconsecutive irrigation days during a crop cycle.

14 Claims, 3 Drawing Sheets

(56) References Cited

U.S. PATENT DOCUMENTS

| | | |
|---|---|---|
| 8,568,506 B1 | 10/2013 | Miller et al. |
| 8,821,646 B1 | 9/2014 | Miller et al. |
| 9,148,993 B1 | 10/2015 | Miller et al. |
| 9,161,489 B1 | 10/2015 | Miller et al. |
| 9,474,215 B1* | 10/2016 | Miller .................. A01C 23/042 |
| 2009/0249848 A1 | 10/2009 | Peters |
| 2016/0200636 A1* | 7/2016 | Roach ..................... C05F 11/08 71/6 |
| 2016/0304407 A1* | 10/2016 | Bame ........................ C05B 7/00 |
| 2016/0347675 A1* | 12/2016 | Roach ..................... C05D 1/00 |

* cited by examiner

METHOD AND COMPOSITION FOR AGRICULTURAL POTASSIUM AND NUTRIENT FERTIGATION

CROSS REFERENCE TO RELATED APPLICATIONS

This application is a continuation of U.S. patent application Ser. No. 15/059,731, filed Mar. 3, 2016, pending, which is a continuation-in-part of U.S. patent application Ser. No. 14/833,484, filed Aug. 24, 2015, now U.S. Pat. No. 9,474,215, which is a continuation-in-part of U.S. patent application Ser. No. 14/564,594, filed Dec. 9, 2014, now U.S. Pat. No. 9,161,489, all of which are incorporated herein by reference as if fully set forth herein.

BACKGROUND OF THE INVENTION

The present invention relates to methods for fertilization by adding fertilizer nutrients to agricultural irrigation systems.

The agriculture industry adds fertilizers to the plant environs, such as the soil, to enhance crop growth and subsequent yields. Commercial fertilizers are usually selected of a variety of formulations depending on the crop and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$. Nitrogen, phosphorus and potassium are the basic plant nutrients or macronutrients that are taken up and utilized by the growing crops, and they are commonly provided or augmented by the addition of fertilizers (NPK fertilizers).

A fertilizer, as that term is used herein and as generally understood, refers to the nutrient-containing materials used to deliver fertilizer nutrients to a crop. Conventional fertilizers typically will contain materials that are extraneous to the crop's nutrient-uptake and soil condition ("yield-extraneous constituents") but which, for practical and/or other reasons, are necessary to the delivery of the nutrients. The process of delivering fertilizer nutrients to crops is referred to as fertilization.

The fertilization method of adding fertilizers to the water being used to irrigate the crops is called "fertigation," reflecting this combination of irrigation and fertilization. Fertigation reduces equipment, fuel and labor expended in the addition of fertilizers in comparison to mechanical delivery of fertilizers to the crop, and thus fertigation achieves a significant overall cost savings.

To conserve water, which is decreasing in availability and increasing in cost, current conventional technology includes micro-irrigation systems that deliver precise amounts of water directly to the soil holding the root system of the plant that is being grown. In the past twenty to thirty years, a large percentage of crop producers in the western and southwestern United States have converted from flood and sprinkler irrigation systems to micro-irrigation technology. Micro-irrigation systems contain devices called emitters, micro-sprinklers or other such devices that provide the precise amounts of water directly to the desired soil site, namely the soil holding the roots of the plant or crop being irrigated.

Micro-irrigation systems are sensitive to water quality and the inclusion of fertilizers and other additives stemming from the refinement of their micro components. These emitters, micro-sprinklers or other micro devices have very tiny orifices and/or a long tortuous narrow passageway that provide the requisite pressure for delivery of precise amounts of water in a uniform manner to each plant in the crop being irrigated so long as deposits do not build up inside them. Deposits from any source foul or plug these micro components. The smallest particle or foreign material can cause fouling of these devices. Water quality and the inclusion of fertilizers can, and frequently does, cause severe plugging problems. The problems arise from a number of factors: (1) the irrigation water is typically obtained from wells, reservoirs, canals, lakes, or rivers which contain various amounts of dissolved minerals; and (2) fertilizers can form insoluble salts and/or cause particulate formation when added to the water. Macro-irrigation systems (macro-sprinkler irrigation systems) mainly tolerate these conditions, while micro-irrigation systems are extremely intolerant.

In more detail, the addition of conventional fertilizer formulations to irrigation water normally increases the loading of inorganic salts over that already in the water. When the loading, or the combined loading, is too high, the solubilities of at least some of the naturally-occurring irrigation-water minerals and/or added compounds are exceeded and particulate formation increases dramatically. When particulates form, significant deposits begin to build up throughout the irrigation system. The end result for emitters or micro-sprinklers is plugging.

Plugging results in uneven distribution of water and nutrients to the crop being irrigated, and in some cases, the complete shut-down of the micro-irrigation system. Problem-free use of additives such as fertilizers in micro-irrigation systems is normally seen only in irrigation systems that use relatively pure water sources.

The conventional agricultural practice is to make intermittent or periodic applications of fertilizers. Such intermittent or discontinuous additions might be a single addition, or a plurality of additions, of large amounts (high concentrations) of fertilizer during a brief time interval each growing season or crop cycle. (The number of applications per growing season or crop cycle usually depends on the crop and/or the type of fertilizer being added.) When the fertilizer-delivery method is fertigation, fertilizers are typically slug fed into the irrigation system as quickly as possible to minimize the labor requirements and ease material handling. Slug feeding of a block (portion of a field) normally entails feeding the large amounts (high concentrations) of fertilizer to the irrigation water over a six to seven hour period during irrigation, and then, after the fertilizer feed is shut off, continuing the irrigation of that block for an additional two to three hours to rinse out all of the fertilizer that is contained inside the irrigation system, insuring that all of the fertilizer intended for the block is in fact delivered to the block. When an entire field is irrigated on a single day, slug feeding does not require a post-fertigation rinsing period.

The cost of commercial fertilizer formulations is, however, itself significant, and commercially viable fertilizer formulations (formulations sufficiently inexpensive for bulk agricultural use) typically include, as mentioned above, yield-extraneous constituents which do not contribute to plant nutrition or soil condition, and can even be undesirable components. Further, the bulk weight of commercial fertilizer formulations typically is water which increases the shipping costs. The water of a fertilizer formulation might be deemed to be analogous to, or at least approach being, a yield-extraneous constituent because its contribution to the water requirements of a crop normally is negligible, it is however not in fact extraneous and therefore herein is neither categorized as a yield-assist or yield-extraneous constituent.

The terms "micro-irrigation" and "macro-irrigation" as used herein refer respectively to (1) micro-sprinklers, drip, and subsurface drip systems and (2) sprinkler systems without micro components which are primarily overhead sprinklers. The terms "overhead sprinkler" and "overhead sprinklers" as used herein refer to irrigation systems in which the irrigation water is emitted or sprayed from sprinkler heads, nozzles or other irrigation devices disposed at a position elevated from ground level, that normally (but not necessarily) are engaged directly above the crop being irrigated. Overhead sprinkler irrigation systems are normally macro-irrigation systems because micro-irrigation normally depend on a close proximity between the emitters and soil immediate the crop while overhead sprinklers are normally spaced apart from the soil immediate the crop. Such micro- and macro-irrigation systems are collectively referred to herein as "emitter-irrigation" systems because they each emit or eject sequential small quantities of irrigation water from irrigation lines or tubes directed more or less towards the crop being irrigated.

SUMMARY OF THE INVENTION

As stated in U.S. Pat. No. 9,161,489, Method and Composition for Agricultural Potassium Fertigation, issued Oct. 20, 2015, inventors Miller et al., the contents of which are incorporated herein by reference, its discontinuous emitter-irrigation potassium fertigation does not exclude concomitant addition of other materials, including but not limited to one or more other fertilizers and the like. The present invention provides a method for discontinuous emitter-irrigation potassium-plus fertigation ("discontinuous potassium-plus fertigation"), wherein a potassium-plus nutrient feedstock comprising potassium formate, at least one non-potassium formate constituent that is beneficial to the crop's nutrient-uptake and/or soil condition ("additional yield-assist constituent"), which preferably is a macro-nutrient, and water is charged to an active emitter-irrigation system to form treated irrigation water, wherein the potassium-plus nutrient feedstock has a high potassium-nutrient content, has a high organic carbon content, has a minimal amount of water, has no or negligible essential yield-extraneous constituent such as sulfate, has no essential yield-adverse constituent such as degradable thiosulfate, phosphate when fed under phosphate-precipitation conditions or chloride and has no constituent that could aggravate the plugging potential of treated irrigation water. In preferred embodiments, particularly with respect to micro-irrigation systems, concomitant addition of other materials is limited to materials having molecular weights that do not exceed 1,000 g/mol as charged or as developed within the irrigation system.

DETAILED DESCRIPTION

Discontinuous Potassium Plus Fertigation

Figure 1:
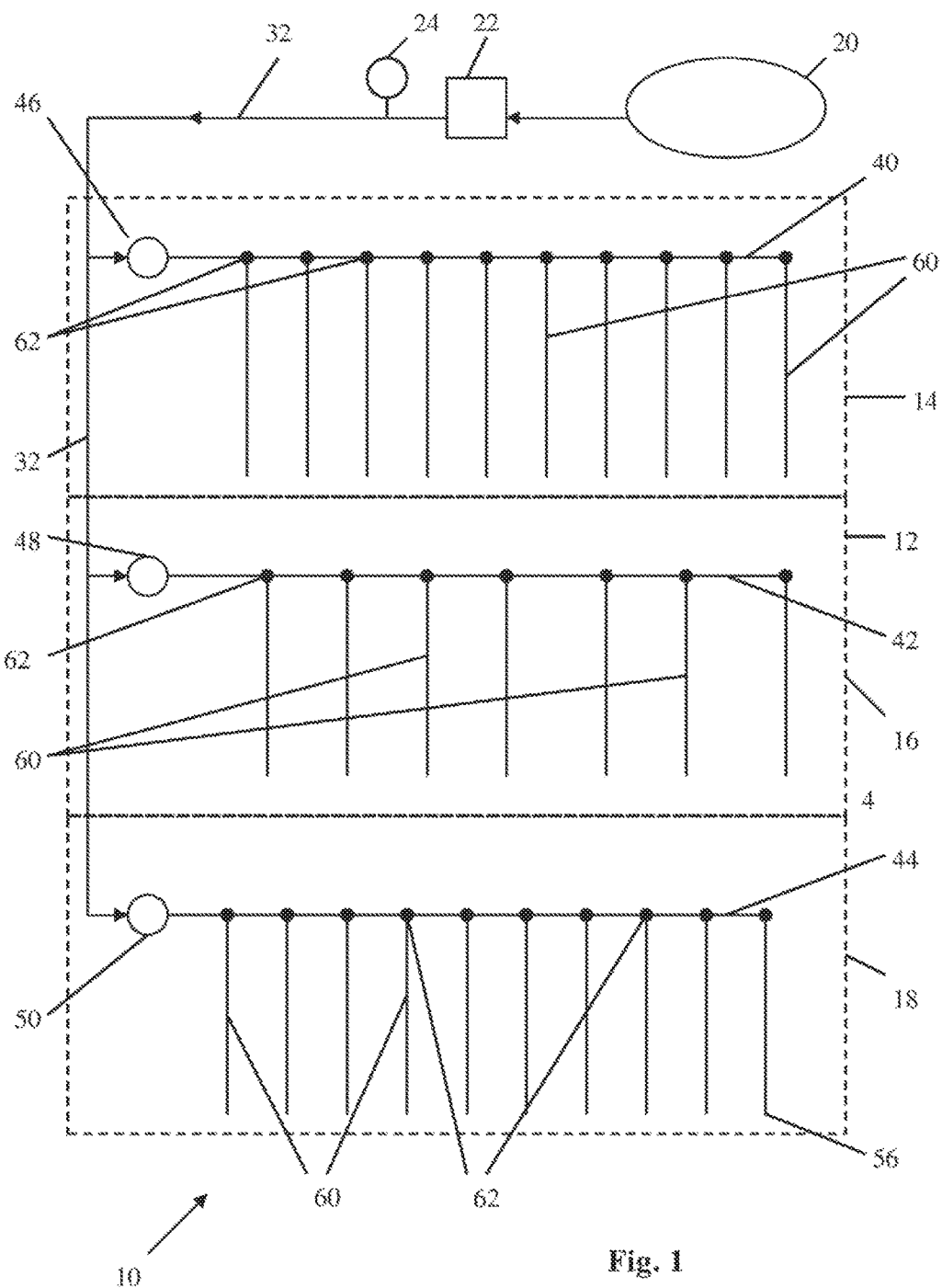
FIG. 1 is a schematic drawing of an irrigation system using the method of the present invention.

The feeding of the potassium-plus nutrient feedstock to the irrigation water is intermittent or discontinuous. By a discontinuous feeding of potassium-plus nutrient feedstock (or slug feeding of potassium-plus nutrient feedstock) is meant herein that the potassium-plus nutrient feedstock is fed to a given agricultural field, which can be a block in a multi-block field, on from one to six nonconsecutive days during a crop cycle. Further, the potassium-plus nutrient feedstock is preferable fed to the irrigation system for a time period of from 1 to 9 hours on a given potassium-plus fertigation day during which time the irrigation system is active (at its full or normal operating pressure which is from about 10 to 150 psi depending on the system).

The Potassium Plus Nutrient Feedstock

The method of the present invention, namely the method for potassium-plus fertigation by charging a potassium-plus nutrient feedstock comprised of potassium formate, at least one additional yield-assist constituent and water to the irrigation system, is drastically advantageous because the feedstock has a high potassium-nutrient content, has a high organic carbon content, has at least one additional yield-assist constituent, which preferably is a macro-nutrient, has a low or minimal amount of water, has no essential yield-extraneous constituent such as sulfate, has no yield-adverse constituent such as degradable thiosulfate, phosphate when fed under phosphate-precipitation conditions or chloride, and its low water content reduces shipping, storage and handling costs. It has no cations or anions (such as unstable phosphate as mentioned above) that increase the deposit-forming load of the irrigation water to which it is fed. Such anions or cations, and other adverse constituents such as degradable thiosulfate, are typically present in commercial fertilizers because they are needed for the delivery of the nutrient or for other reasons tied to the respected formulation; in other words, they are essential yield-adverse constituents with respect to those formulations.

The present method for discontinuous potassium-plus fertigation in preferred embodiments adds a potassium-plus nutrient feedstock comprised of potassium formate and, as the additional yield-assist constituent, a source of nitrogen plant nutrient. In other preferred embodiments, the potassium-plus nutrient feedstock comprises potassium formate and, as additional yield-assist constituents, both a source of nitrogen plant nutrient and a source of phosphorus plant nutrient. In further preferred embodiments, the potassium-plus nutrient feedstock includes one or more sources of the micro-nutrients zinc, copper, iron and/or manganese, all of which micro-nutrients are additional yield-assist constituents. In other preferred embodiments, the potassium-plus nutrient feedstock further includes formic acid which has a high organic carbon content and lowers the pH of the feedstock, and thus itself is an additional yield-assist constituent.

Example 1, Feedstock 1

To 35.71 parts of a 75 wt. percent aqueous potassium formate solution is added, with mixing, 32.19 parts of water and 32.10 parts urea, whereby a stable potassium-plus nutrient feedstock is formed. This feedstock is a 15-0-15 NPK fertilizer.

Example 2, Feedstock 2

To 28.60 parts of a 75 wt. percent aqueous potassium formate solution is added, with mixing, 39.02 parts of water, 25.71 parts urea and 6.67 parts of zinc disodium EDTA ($C_{10}H_{12}N_2Na_2O_8Zn$, 15% as Zn), whereby a stable potassium-plus nutrient feedstock is formed. This feedstock is a 12-0-12 NPK with 1.0% Zn fertilizer.

Example 3, Feedstock 3

To 28.60 parts of a 75 wt. percent aqueous potassium formate solution is added, with mixing, 38.00 parts of water, 25.71 parts urea and 7.69 parts of iron sodium EDTA ($C_{10}H_{12}N_2NaO_8Fe$, 13% as Fe), whereby a stable potassium-plus nutrient feedstock is formed. This feedstock is a 12-0-12 NPK with 1.0% Fe fertilizer.

Example 4, Feedstock 4

To 28.60 parts of a 75 wt. percent aqueous potassium formate solution is added, with mixing, 39.00 parts of water, 25.71 parts urea and 6.67 parts of copper disodium EDTA ($C_{10}H_{12}N_2NaO_8Cu$, 15% as Cu), whereby a stable potassium-plus nutrient feedstock is formed. This feedstock is a 12-0-12 NPK with 1.0% Cu fertilizer.

Example 5, Feedstock 5

To 28.60 parts of a 75 wt. percent aqueous potassium formate solution is added, with mixing, 31.33 parts of water, 25.71 parts urea, 3.33 parts of zinc disodium EDTA, 3.33 parts copper disodium EDTA, 3.85 parts of iron sodium EDTA and 3.85 parts of manganese disodium EDTA, whereby a stable potassium-plus nutrient feedstock is formed. This feedstock is a 12-0-12 NPK with 0.5% Zn, 0.5% Cu, 0.5% Fe and 0.5% Mn fertilizer.

Example 6, Feedstock 6

To 19.06 parts of a 75 wt. percent aqueous potassium formate solution is added, with mixing, 52.27 parts of water, 12.85 parts urea, 9.43 parts of DAP (di-ammonium phosphate, $(NH_4)_2HPO_4$, which itself is an 18-4-0 NPK fertilizer), 5.39 parts of 75% phosphoric acid ($H_3PO_4$) and 1 part of a threshold inhibitor, whereby a stable potassium-plus nutrient feedstock is formed. This feedstock is an 8-8-8 NPK fertilizer.

Example 7, Feedstock 7

To 14.28 parts of a 75 wt. percent aqueous potassium formate solution is added, with mixing, 31.69 parts of water, 12.86 parts urea, 33.13 parts of 75% phosphoric acid ($H_3PO_4$), 7.18 parts formic acid and 1 part of a threshold inhibitor, whereby a stable potassium-plus nutrient feedstock is formed. This feedstock is a 6-18-6 NPK fertilizer.

The constituents of feedstocks of Examples 1-7 are set forth below in Table 1 wherein the organic material derived from urea (determined by the amount of urea less the nitrogen thereof) is shown as an additional yield-assist constituent because organic materials stimulate microbial activity in the soil. The EDTA and threshold inhibitor (such as aminotris(methylenephosphonic acid), $N(CH_2PO_3H_2)_3$ [ATMP] or EDTA) also contribute organic material which is not quantified in Table 1 but instead is reflected by indicating that certain of the additional yield-assist constituents are greater than those quantified. Further, nitrogen sources other than urea and DAP (such as ammonia and ammonium nitrate) can be used but are not preferred.

TABLE 1

| | Feedstock # and NPK | | | | | | |
|---|---|---|---|---|---|---|---|
| | 1 | 2 | 3 | 4 | 5 | 6 | 7 |
| Constituent | | | | | | | |
| (Parts by wt. per 100 parts by wt.) | 15-0-15 | 12-0-12 | 12-0-12 | 12-0-12 | 12-0-12 | 8-8-8 | 6-18-6 |
| Potassium Formate ($HCO_2K$) | 26.78 | 21.45 | 21.45 | 21.45 | 21.45 | 14.30 | 10.71 |
| K (as $K_2O$) from ($HCO_2K$) | 15 | 12 | 12 | 12 | 12 | 8 | 6 |
| Organic Carbon from ($HCO_2K$) | 3.82 | 3.06 | 3.06 | 3.06 | 3.06 | 2.04 | 1.53 |
| Additional Yield-Assist Constituent | | | | | | | |
| N (as N) | 15 | 12 | 12 | 12 | 12 | 8 | 6 |
| P (as $P_2O_5$) | — | — | — | — | — | 8 | 18 |
| Zn | — | 1 | — | — | 0.5 | — | — |
| Cu | — | — | — | 1 | 0.5 | — | — |
| Fe | — | — | 1 | — | 0.5 | — | — |
| Mn | — | — | — | — | 0.5 | — | — |
| Total Acid | — | — | — | — | — | 4.04 | 30.23 |
| Organic from Urea | 17.1 | 13.7 | 13.7 | 13.7 | 13.7 | 6.9 | 6.9 |
| Total Add. Yield-Assist Const. | 32.1 | >26.7 | >26.7 | >26.7 | >27.7 | >26.94 | >61.13 |
| Total Water | 41.12 | 46.17 | 45.15 | 46.17 | 38.48 | 58.39 | 45.34 |
| Yield-Extraneous Constituents | none | none | none | none | none | none | none |
| Yield-adverse Constituents | none | none | none | none | none | none | none |
| Constituents of MWt. > 1,000 | none | none | none | none | none | none | none |

As shown in the above Examples 1-7, Table 1 and comments, the preferred sources of nitrogen are urea, di-ammonium phosphate (DAP), ammonia and ammonium nitrate (and more preferably urea and di-ammonium phosphate), and the preferred sources of phosphorus are phosphoric acid and di-ammonium phosphate. The primary source of organic carbon is potassium formate, and the organic carbon (which can be also expressed as organic material) content is also shown augmented by organic carbon from formic acid, urea and other organics (such as EDTA).

In preferred embodiments, the potassium-plus nutrient feedstock comprises from 10 to 50 weight percent potassium formate and from 1 to 35 weight percent additional yield-assist constituent(s), and more preferably from 5 to 35 weight percent potassium formate and from 5 to 35 percent additional yield-assist constituent(s) which preferably are selected from the group consisting of N (as N), P (as $P_2O_5$), Zn, Cu, Fe, Mn, and acid. In preferred embodiments that provide substantial levels of a plurality of macro-nutrients, the potassium-plus nutrient feedstock comprises from 10 to 35 weight percent potassium formate and from 5 to 35 weight percent additional yield-assist constituent(s) wherein N (as N), P (as $P_2O_5$), acid and combinations thereof comprise from 90 to 100 weight percent of the additional yield-assist constituent(s). In more preferred embodiments, the sources of additional yield-assist N are urea and DAP, the source of additional yield-assist P is phosphoric acid, the sources of additional yield-assist organic carbon is formic acid, the sources of additional yield-assist Zn, Cu, Fe and Mn are respectively zinc disodium EDTA, copper disodium EDTA, iron sodium EDTA and manganese disodium EDTA, and the sources of additional yield-assist acid are phosphoric acid, formic acid and combinations thereof.

The potassium-plus nutrient feedstock, which is charged to an active emitter-irrigation system to form treated irrigation water, therefore has a high potassium-nutrient content, has a high organic carbon content (which is some embodiments is derived also from formic acid), has a minimal amount of water (from 35 to 65 weight percent), has a minimal amount of non-water yield-extraneous constituent(s) (from 1 to 40 weight percent), has no essential yield-adverse constituent and has no essential constituent with a molecular weight (MWt.) greater than 1,000 or precursor thereto (in other words, no constituent that will exceed 1,000 g/mol as charged or as developed within the irrigation system).

Further, in preferred embodiments, the potassium-plus nutrient feedstock is charged to the irrigation system at levels sufficient to provide a concentration of from 50 to 20,000 ppm of potassium as $K_2O$ in said treated irrigation water, and more preferably from 100 to 10,000 ppm of potassium as $K_2O$ in said treated irrigation water.

Further, in other preferred embodiments, the potassium-plus nutrient feedstock is charged to the irrigation system at an addition rate of from 0.15 to 50 gal./min., and more preferably at an addition rate of from 0.5 to 20 gal./min., and at an addition rate of from 0.15 to 50 gal./1,000 gal. irrigation water, and more preferably at an addition rate of from 0.5 to 20 gal./1,000 gal. irrigation water.

In contrast, the most basic (simple) sources of potassium used in conventional agricultural fertigation are potassium sulfate and potassium thiosulfate. Potassium sulfate is soluble only up to 5% potassium as $K_2O$ (a 0-0-8 NPK fertilizer). Potassium thiosulfate (a 0-0-25 NPK fertilizer) has a higher solubility than potassium sulfate (but still far lower than the present invention), but it is expensive and, since the sulfur of thiosulfate is not in its highest oxidation state, it is at risk of decomposition and precipitation, which leads to fouling of the irrigation system and impaired irrigation. (No oxidants, such as chlorine, can be used in the irrigation system at or about the same time as potassium thiosulfate.) Potassium nitrate, another potassium source, is very soluble, but (a) its distribution is restricted or prohibited by laws and/or regulations because of security risks associated with its nitrate content, and (b) it is prohibitively expensive.

The treated irrigation water formed by the method of the present invention preferably will have from 50 to 20,000 ppm potassium as $K_2O$ and from 50 to 15,000 ppm additional yield-assist constituent(s), preferably selected from the group consisting of N (as N), P (as $P_2O_5$), Zn, Cu, Fe, Mn, acid and combinations thereof, and more preferably wherein from 90 to 100 weight percent of the additional yield-assist constituent(s) are selected from the group consisting of N (as N), P (as $P_2O_5$), acid and combinations thereof. In other preferred embodiments, the treated irrigation contains from 100 to 10,000 ppm potassium as $K_2O$ and from 100 to 7,500 ppm additional yield-assist constituent(s) preferably selected from the group consisting of N (as N), P (as $P_2O_5$), Zn, Cu, Fe, Mn, acid and combinations thereof and water and more preferably wherein from 90 to 100 weight percent of the additional yield-assist constituent(s) are selected from the group consisting of N (as N), P (as $P_2O_5$), acid and combinations thereof. In other preferred embodiments, wherein the additional yield-assist constituent(s) are selected from the group consisting of N (as N), P (as $P_2O_5$), Zn, Cu, Fe, Mn, acid and combinations thereof, from 90 to 100 weight percent of the additional yield-assist constituent(s) are selected from the group consisting of N (as N) derived from the group consisting of urea, di-ammonium phosphate and combinations thereof, P (as $P_2O_5$) derived from phosphoric acid, acid selected from the group consisting of phosphoric acid and formic acid and combinations thereof.

The potassium-plus nutrient feedstock is charged to an irrigation system by feeding it to the irrigation water flowing through a main line of an irrigation system (that is, directly charging to a main line of an irrigation system) downstream of any irrigation-system filters and upstream of the delivery points of the irrigation system.

The method of discontinuous emitter-irrigation fertigation of the present invention is carried out at an agricultural field that irrigated as an entirety when irrigation is conducted or is irrigated in sections or portions referred to as blocks. Every emitter-irrigated agricultural field is comprised of blocks, which are either a single block when the field is irrigated as an entirety or a plurality (two or more) of blocks. Referring to FIG. 1, there is shown a schematic illustration of an emitter irrigation system, which can be either a micro-irrigation system or a stationary overhead irrigation system, which is designated by the general reference number 10. The irrigation system 10 provides irrigation water to the grower's field 12, shown in phantom in FIG. 1. Upstream of the field 12 is a source of irrigation water (reservoir 20) and an irrigation pump 22 (irrigation pumping station) which pumps irrigation water from the water source 20 through the main line 32. The field 12 is comprised of three portions or blocks, namely a first block 14, a second block 16 and a third block 18, each of which is shown in phantom in FIG. 1. Each block is serviced by a lateral irrigation line, namely a first lateral line 40, a second lateral line 42 and a third lateral line 44. Irrigation water flow to each lateral line 40, 42, 44 is controlled by a shutoff valve, namely a first shut-off valve 46, a second shut-off valve 48 and a third shut-off valve 50, each neighboring the intersection of the respective lateral line with the main irrigation line 32. Under normal operating conditions, only one of the shut-off valves 46, 48, 50 would be open, and only one of the blocks 14, 16, 18 would be undergoing irrigation, at any given time. Each block has a plurality of irrigation lines 60 branching of the respective lateral line and stretching out along the crops (not shown) in the respective block. Each irrigation line 60 has a plurality of emitters (not shown) at which irrigation water is delivered to the crops. At the intersection of each irrigation line 60 and the respective lateral line from which it stems is a riser 62. Each riser 62 is a small shut-off valve permitting the halting of water flow to its respective irrigation line 60 without curtailing water flow to the remaining irrigation lines 60 in the respective block. Downstream of pump 22, and upstream of the field 12 (and of course upstream of each of the blocks 14, 16, 18 which comprise the field 12) is a feed station 24 at which the feedstock is fed to the irrigation water, converting the irrigation water into treated irrigation water.

Figure 2:
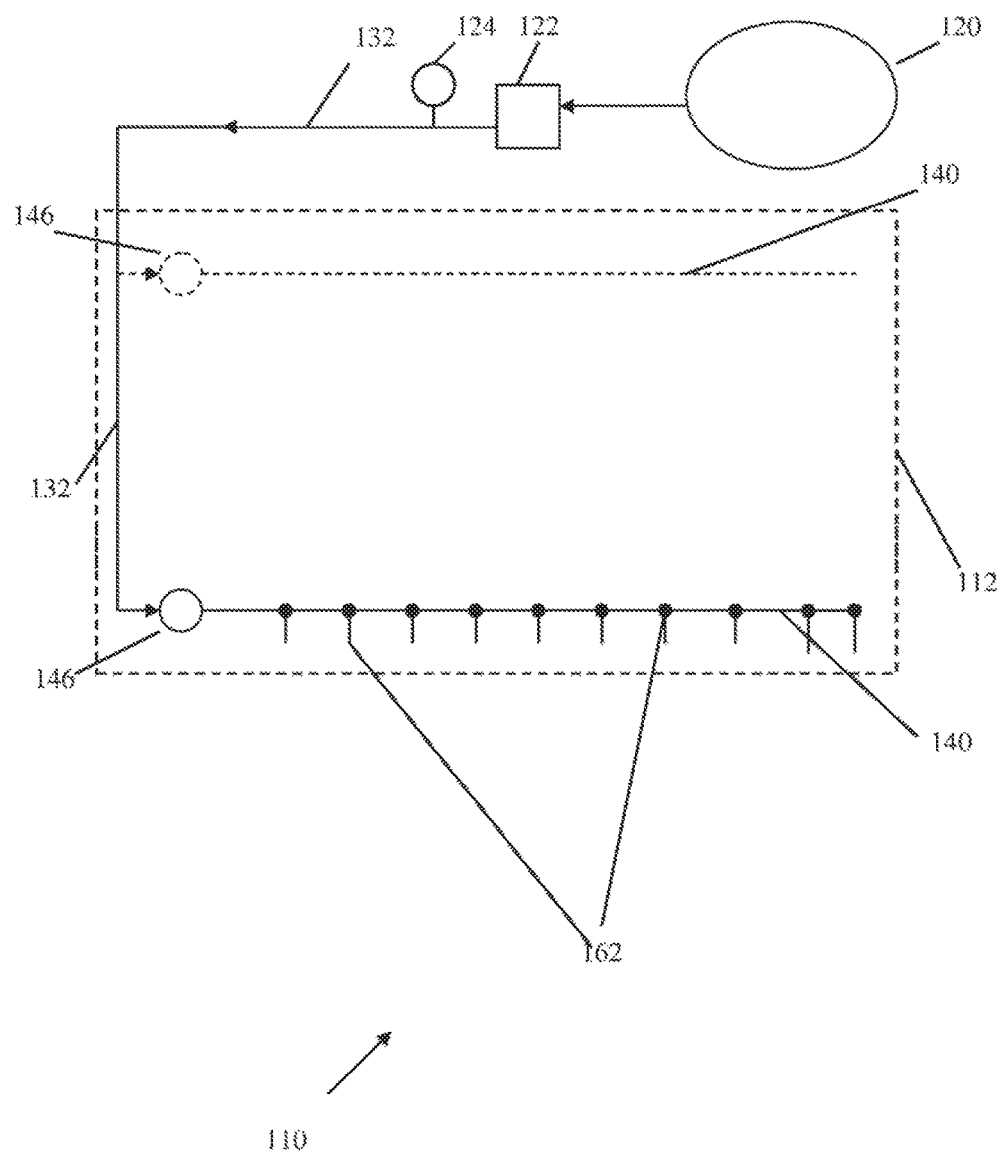
FIG. 2 is a schematic drawing of an irrigation system using the method of the present invention.

Referring to FIG. 2, there is shown a schematic illustration of an emitter irrigation system, which in this instance is a mobile overhead emitter irrigation system, and which is designated by the general reference number 110. The irrigation system 110 provides irrigation water to the grower's field 112 (shown in phantom in FIG. 2). Upstream of the field 112 is a source of irrigation water (reservoir 120) and an irrigation pump 122 (irrigation pumping station) which pumps irrigation water from the reservoir 120 through a flexible main line 132. This field 112 is serviced by a mobile elevated lateral irrigation line 140. Irrigation water flow to lateral line 140 is provided through a line connector 146 at an end of lateral line 140 which accepts a connection with the flexible main irrigation line 132. The flexible main irrigation line 132 preferably has a shut-off valve (not shown). The mobile lateral line 140 has a plurality of emitters 162 (irrigation delivery points) at which irrigation water is delivered to the crops. Ten emitters 162 are shown in FIG. 2 for simplicity and in actuality a typical mobile lateral line would have dozens of emitters. The mobile lateral line 140 rolls from position to position along the field 112, for instance from the position far out in the field 112 shown to a near position shown in phantom (in which the emitters 162 are not shown for simplicity), delivering treated irrigation water to the crops (not shown) at each position. Downstream of pump 122 and upstream of the field 112 is a feed station 124 at which the feedstock is fed to the irrigation water, converting the irrigation water into treated irrigation water.

Figure 3:
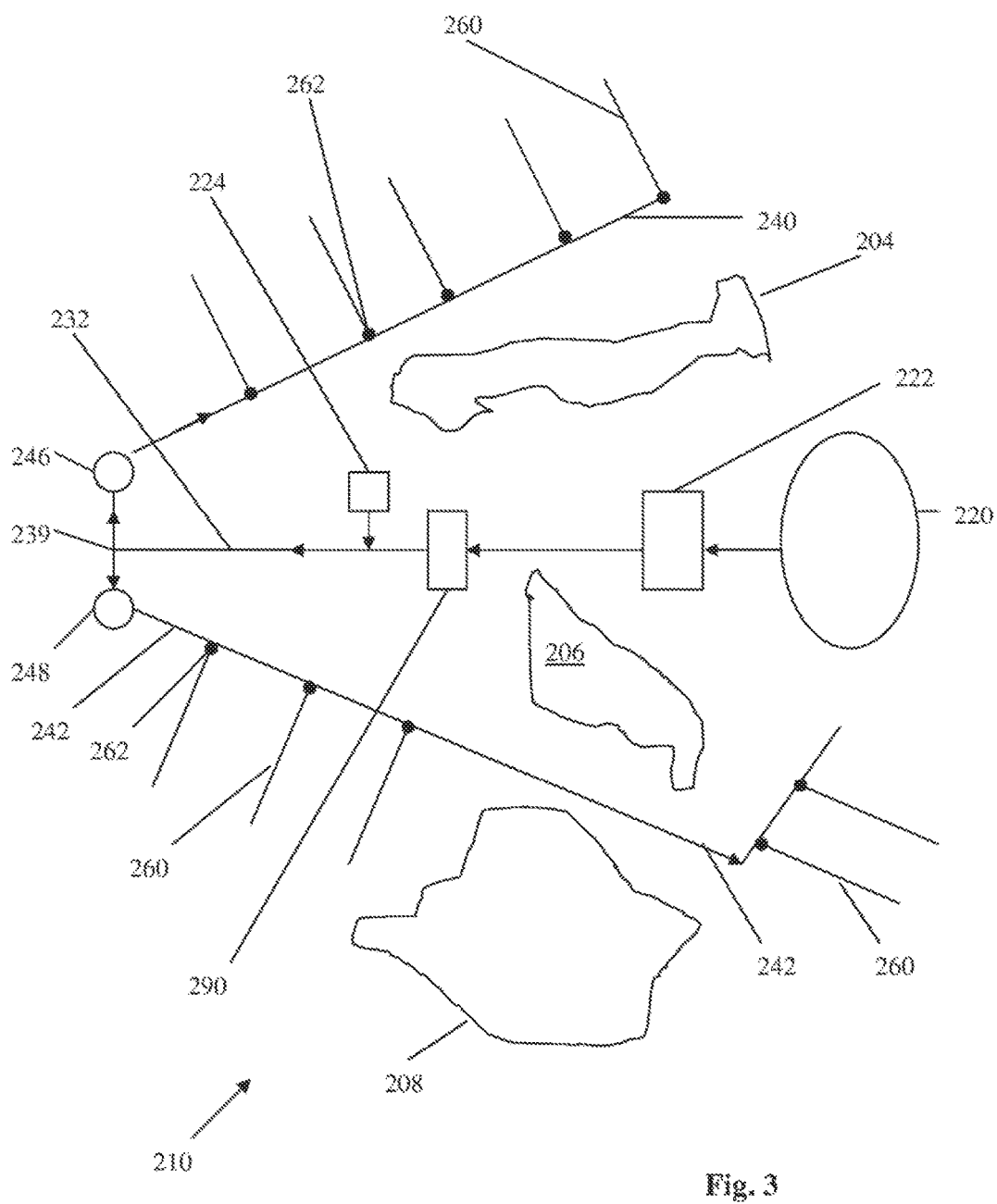
FIG. 3 is a schematic drawing of an irrigation system using the method of the present invention.

Referring to FIG. 3, there is shown a schematic illustration of an emitter irrigation system designated by the general reference number 210. The irrigation system 210 provides irrigation water to the field under cultivation laid out among hills 204, 206, 208 which themselves are not under cultivation. The source of irrigation water 220 is flanked by hills 204, 206. Irrigation water is drawn from the irrigation water source 220 by a plurality of pumps (not shown) of an irrigation pumping station 222 into a main line 232. The main line 232 branches into two lateral lines, namely the first lateral line 240 and the second lateral line 242. Irrigation water flows to the first and second lateral lines 240, 242 are controlled respectively by the first and second shut-off valves 246, 248, each neighboring the intersection 239 of the lateral lines 240, 242 with the main irrigation line 232. There is a branching of the main line 232 at intersection 239. Each lateral line has a plurality of irrigation lines 260 branching off and stretching out along the crops (not shown). Each irrigation line 260 has a plurality of irrigation delivery points (not shown) at which irrigation water is delivered to the crops. At the intersection of each irrigation line 260 and the respective lateral line from which it stems is a riser 262 (small shut-off valve) permitting the halting of water flow to its respective irrigation line 260. A feedstock delivery system 224 is installed downstream of the irrigation pump 222, and downstream of a filter 290 which filters solid debris out of the irrigation water flowing through the main water line 232.

Demonstrative Example 1

The method of the present invention was assessed for use at a 150-acre vineyard having an eight-month crop cycle (February 1 through September 30), a micro-irrigation system, an irrigation water usage of 1.0 ac-ft/acre during the first five months and 1.0 ac-ft/acre during the last three months and an irrigation water flow rate of 1,000 gal/min. The source of potassium is a potassium-plus nutrient feedstock of the present invention, which in this instance is Feedstock 1 (a nonconventional 15-0-15 NPK fertilizer), which is slug-fed to the irrigation water during an eight-hour irrigation day on each of March 1, June 15 and September 15 in the respective amounts of 5.4 lbs./acre potassium (as $K_2O$) plus 5.4 lbs./acre nitrogen (as N), 3.6 lbs./acre potassium (as $K_2O$) plus 3.6 lbs./acre nitrogen (as N), and 5.4 lbs./acre potassium (as $K_2O$) plus 5.4 lbs./acre nitrogen (as N), which provides a total amount of 14.4 lbs./acre potassium (as $K_2O$) plus 14.4 lbs./acre nitrogen (as N) during the crop cycle. The levels of potassium (as $K_2O$) and nitrogen (as N) fed to the irrigation water during each eight-hour slug feeding were each about 803 lb., 536 lb. and 803 lb., respectively, which provided levels of potassium (as $K_2O$) and nitrogen (as N) in the total 480,000 gallons of treated irrigation water of 201 ppm, 134 ppm and 201 ppm, respectively. The feed rates of the potassium-plus nutrient feedstock were about 0.85 gallons/min., 0.57 gallons/min. and 0.85 gallons/min., or with respect to the volume of irrigation water, 0.85, 0.57 and 0.85 gallons of feedstock per 1,000 gallons of irrigation water.

Demonstrative Example 2

The method of Example 1 is repeated except that the three slug feedings of Feedstock #1 are respectively in the amounts of 10.8 lbs./acre potassium (as $K_2O$) plus 10.8 lbs./acre N (as N), 7.2 lbs./acre potassium (as $K_2O$) plus 7.2 lbs./acre nitrogen (as N) and 10.8 lbs./acre potassium (as $K_2O$), which provided a level of potassium (as $K_2O$) in the treated irrigation water of 402 ppm, 268 ppm and 402 ppm respectively. The feed rates of the potassium-plus nutrient feedstock were about 1.7, 1.14 and 1.7 gallons/min. (gallons/1,000 irrigation-water gallons).

Demonstrative Example 3

The method of Example 1 is repeated, except that the three slug feedings were of Feedstock #6, and each was in the amount of 2.6 lbs./acre of each of potassium (as $K_2O$), nitrogen (as N) and phosphorous (as $P_2O_5$), which provided a level of each of potassium (as $K_2O$), nitrogen (as N) and phosphorous (as $P_2O_5$) in the treated irrigation water of 96 ppm. The feed rate of the potassium-plus nutrient feedstock was 0.77 gallons/min. or 0.77 gallons/1,000 irrigation-water gallons during each slug feed.

All percentages mentioned herein are percentages by weight. The term "constituent(s)" as used herein includes the singular "constituent" and the plural "constituents."

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

What is claimed is:

1. A method of fertigation of an agricultural field, comprising:
   charging a feedstock to a stream of flowing irrigation water upstream of said agricultural field to convert said irrigation water to treated irrigation water, wherein said feedstock (i) comprises from 5 to 35 wt. percent potassium formate, from 5 to 35 wt. percent additional yield-assist constituent(s) and water, and (ii) is present in said treated irrigation water at a level providing from 50 to 10,000 ppm of potassium as $K_2O$ and from 100 to 7,500 ppm of said additional yield-assist constituent(s); and
   irrigating said agricultural field with said treated irrigation water.

2. The method of claim 1, further comprising repeating the method on 1 to 5 nonconsecutive irrigation days over a crop cycle.

3. The method of claim 2, wherein said feedstock is charged from 1 to 9 hours during an irrigation day.

4. The method of claim 1, wherein said additional yield-assist constituent(s) are selected from the group consisting of N (as N), P (as $P_2O_5$), Zn, Cu, Fe, Mn, acid and combinations thereof.

5. The method of claim 1, wherein said agricultural field is irrigated using an emitter-irrigation system.

6. The method of claim 5, wherein said emitter-irrigation system comprises a micro-irrigation system or an overhead sprinkler system.

7. The method of claim 5, wherein said feedstock is charged to said emitter-irrigation system by feeding it to the irrigation water flowing through a main line of said emitter-irrigation system downstream of any filters in said emitter-irrigation system and upstream of all delivery points of said emitter-irrigation system.

8. The method of claim 1, wherein said feedstock is charged at a rate of 0.15 to 50 gal./min.

9. A treated irrigation water, comprising irrigation water and a feedstock, wherein said feedstock comprises potassium formate and one or more additional yield-assist constituents, and is present in said irrigation water at a level providing from 50 to 10,000 ppm of potassium as $K_2O$ and from 100 to 7,500 ppm of said additional yield-assist constituent(s).

10. The treated irrigation water of claim 9, wherein said additional yield-assist constituent(s) are selected from the group consisting of N (as N), P (as $P_2O_5$), Zn, Cu, Fe, Mn, acid and combinations thereof.

11. The treated irrigation water of claim 9, wherein said additional yield-assist constituent(s) are selected from the group consisting of urea, EDTA or a salt thereof, aminotris (methylenephosphonic acid) (ATMP), ammonia, ammonium nitrate, di-ammonium phosphate, phosphoric acid, and formic acid.

12. The treated irrigation water of claim 11, wherein from 90 to 100 weight percent of said additional yield-assist constituent(s) are selected from said group.

13. The method of claim 1, wherein said feedstock comprises EDTA or a zinc, copper, iron or manganese salt thereof.

14. The method of claim 1, wherein said feedstock comprises from 10 to 20 wt. percent potassium formate and from 5 to 20 wt. percent said additional yield-assist constituent(s).

* * * * *